United States Patent [19]

Klinkhammer et al.

[11] 4,189,105
[45] Feb. 19, 1980

[54] APPARATUS FOR WINDING A REEL OF FILM

[75] Inventors: Ralf L. Klinkhammer, Cologne; Franz Hoffacker, Langenfeld; Günter H. Steinbüchel; Manfred Hilgers, both of Leverkusen, all of Fed. Rep. of Germany

[73] Assignee: AGFA-Gevaert, A.G., Leverkusen, Fed. Rep. of Germany

[21] Appl. No.: 951,739

[22] Filed: Oct. 16, 1978

[30] Foreign Application Priority Data

Oct. 20, 1977 [DE] Fed. Rep. of Germany ....... 2747099

[51] Int. Cl.² .................... B65H 19/20; B65H 19/18; B65H 17/02
[52] U.S. Cl. ................. 242/56 R; 242/58.1; 242/67.3 R
[58] Field of Search ............. 242/56 R, 55, 58.1, 242/58.2, 58.3, 58.4, 58.5, 67.1 R, 67.3 R; 156/191, 192

[56] References Cited

U.S. PATENT DOCUMENTS

| | | |
|---|---|---|
| 3,024,157 | 3/1962 | Beerli ......................... 242/58.1 X |
| 3,240,329 | 3/1966 | Custin ........................ 242/55 X |
| 3,417,934 | 12/1968 | Palm .......................... 242/67.3 R |
| 3,592,403 | 7/1971 | Schmitt ....................... 242/56 R |
| 3,712,553 | 1/1973 | Napor ......................... 242/67.3 R |
| 3,869,095 | 3/1975 | Diltz .......................... 242/56 R |
| 3,939,032 | 2/1976 | Taitel ......................... 242/58.4 |

*Primary Examiner*—Edward J. McCarthy
*Attorney, Agent, or Firm*—Connolly and Hutz

[57] ABSTRACT

This invention relates to an apparatus for automatically winding a reel of perforated film strip and at the same time inserting a perforated covering strip, which produces reels of uniform quality with an accurately defined starting position and with the perforations of the film strip and of the extension piece in exact alignment with each other.

2 Claims, 4 Drawing Figures

APPARATUS FOR WINDING A REEL OF FILM

This invention relates to an apparatus for winding a reel of perforated film strip and at the same time inserting a perforated covering strip, the apparatus comprising a winding device, and connected thereto, separate feed devices, one for feeding the film strip to the apparatus and the other for feeding the covering strip, each of which feed devices comprises a supply roll for the supply reel, a loop stretcher for equalling out the lengths of strip material, a driving wheel with rotating cutting knives associated therewith and deflecting rollers, with an adhesive strip dispenser with a rotating stamper connected into the feed device for the film strip and an adhesive strip dispenser with an auxiliary roller connected into the feed device for the covering strip.

Film reels in which a covering strip in the form of a protective paper strip is wound up with the film to form a reel from which only a tab of the covering strip projects are produced in large numbers. In these reels, the perforations of the film strip and those of the extension piece must lie exactly above one another because a feeler pin for stopping the movement of the film inside the camera must subsequently engage in these perforations.

It is an object of the present invention to provide an automatic winding device which produces reels of uniform quality with an accurately defined starting position and with the perforations of the film strip and of the extension piece in exact alignment with each other.

According to the invention there is provided an apparatus for winding a reel of perforated film strip and at the same time inserting a perforated covering strip, comprising a winding apparatus and, connected thereto, separate feed devices, one for supplying the film strip to the winding apparatus and the other for supplying the covering strip, each of which feed devices comprises a supply roll, a loop stretcher for equalizing the lengths of strip, a driving wheel and rotating cutting knife associated therewith and deflecting rollers, an adhesive tape dispenser with a rotating stamper being arranged in the feed device for the film strip and an adhesive tape dispenser with an auxiliary roller in the feed device for the covering strip, wherein the driving wheels for the film strip and the covering strip are positively connected by a drive and are coupled to the winding shaft by way of a sprocket belt in which a taut section is deflected over a compensating roller suspended by a tension spring and provided with a stop on one side, so that this taut section is divided into two segments which can be shortened as the circumferential winding force increases, and a slack section is adapted to be deflected over a compensating roller suspended by an adjustable tension spring so that this section can take up the slack of sprocket belt released from the taut section and wherein vacuum openings for holding the film and the covering strip on the driving wheels and air nozzles for correct positioning of the film strip and covering strip are provided on the circumference of the driving wheels and the air nozzles are opened for a short moment to slide the edges of the perforations in the film strip and in the covering strip against the teeth on the driving wheels.

The advantage of this apparatus is that in each operation for producing a reel, the speed of rotation of the winding shaft is reduced in proportion to the increase in the diameter of the reel while the rate at which the film strip and covering strip are supplied remains constant. This is achieved by the compensating roller in the taut section of the belt swinging forwards so that the path from winding axis to compensating roller drive is shortened according to the prevailing paralellogram of forces so that only a fraction of the velocity of the sprocket belt reaches the winding axis through the toothed wheel. In each winding operation, the compensating roller of the slack or driven section takes over the length of belt which has been released from the taut section. On completion of the reel, both compensating rollers return to their starting position under the force of their springs.

The winding shaft is then again in the position in which the slot provided in it for sucking the beginning of the covering strip to it corresponds with the beginning of the covering strip.

The air nozzles which operate by blowing air between the driving wheel and the film strip or covering strip enable the teeth of the driving wheel to be shifted forwards to the edge of the perforation so that the same starting position is always reached irrespective of variations in the length of the film strip and the covering strip which occur due to inaccuracies in manufacture.

In one particular embodiment, the compensating rollers are mounted on pivotal arms.

This construction is simple and allows for good control during operation.

An example of the invention is described below with reference to the accompanying drawings in which FIG. 1 is a diagrammatic view of the automatic winder FIG. 2 illustrates the coupling of the driving wheel for the covering strip with the winding shaft.

Figure 1:
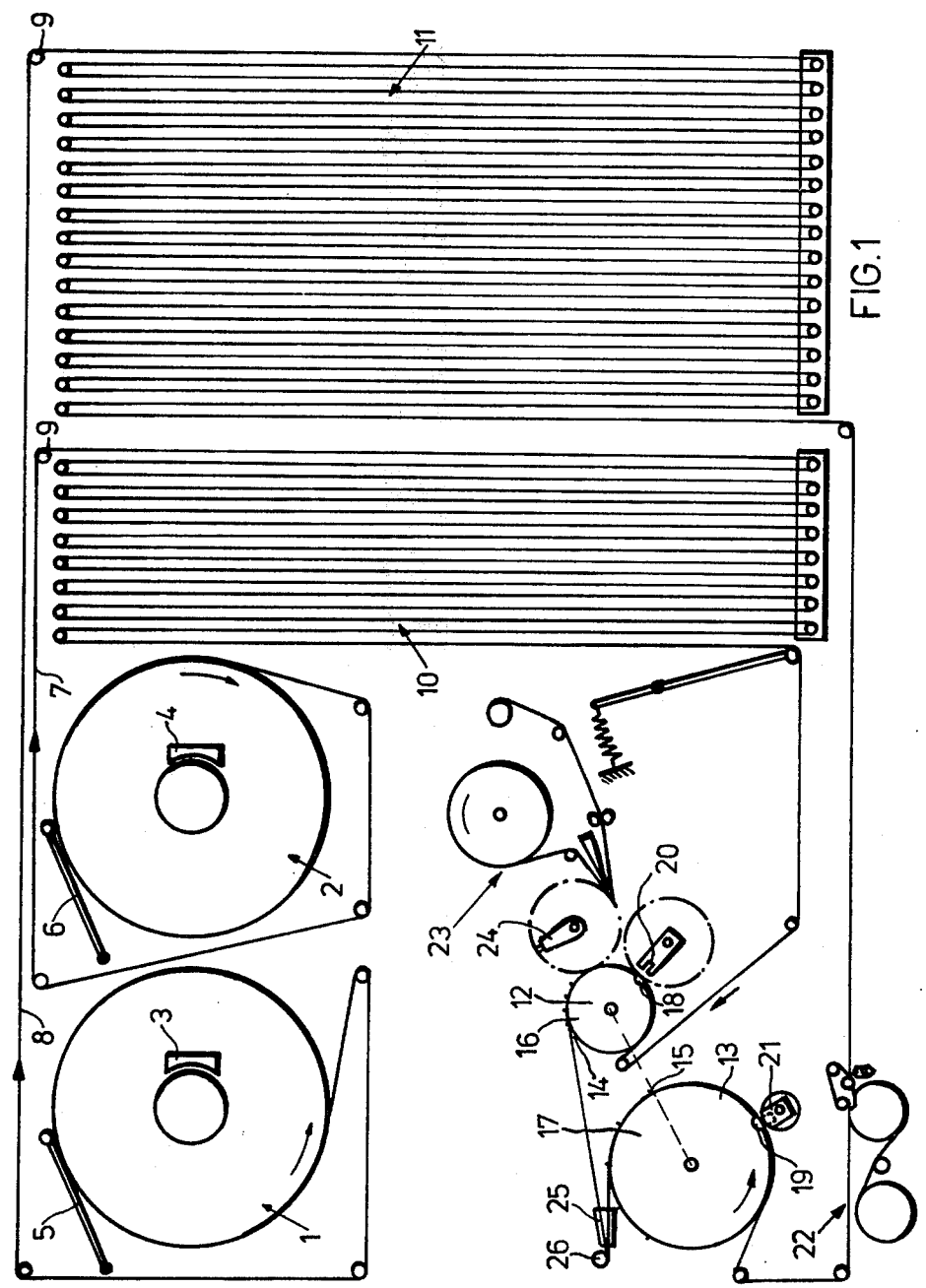

FIG. 1 shows an automatic winder having a supply roll 2 with a brake 4 and a indicator 6 to indicate emptying of the supply roll for the film strip 7 and similarly a supply roll 1 with a brake 3 and an indicator 5 for the covering strip 8. Each of these units consisting of a supply roll, a brake and an indicator is connected to a driving wheel 12 or 13, respectively, by way of deflecting rollers 9 and loop stretchers 10 or 11. Each driving wheel carries sprockets 14 or 15 on its circumference to engage in the perforation, air channels 16 or 17 opening to the outside and a counterblade 18 or 19 for a rotating cutting knife 20 or 21. An adhesive tape dispenser 22 with an auxiliary roller associated with the driving wheel 13 is provided to secure the roll and similarly an adhesive strip dispenser 23 with rotating stamper 24 associated with the driving wheel 12 is provided to secure the film strip 7. Adjacent the driving wheels 12 and 13 there is provided a film guide 25 for guiding the film strip 7 and the covering strip 8 to a winding shaft 26.

Figure 2:
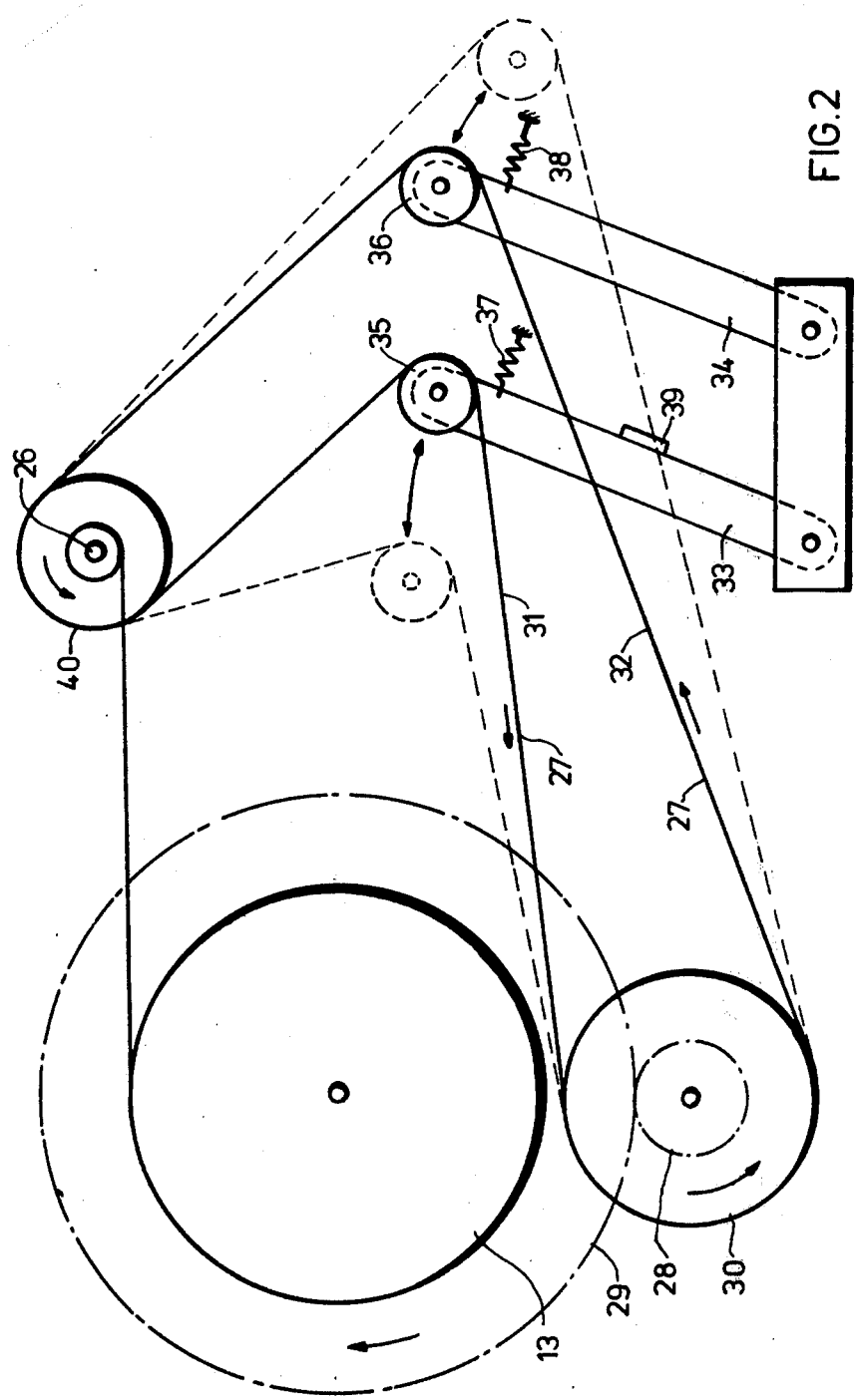
Figure 3:
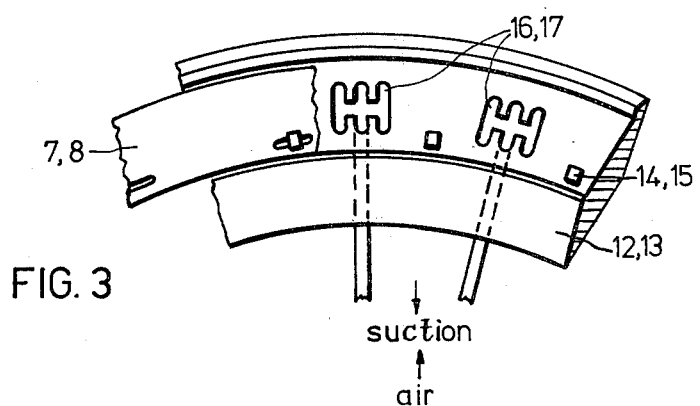
FIG. 3 is a fragmental pictorial view of drive wheel and suction lines.

FIG. 2 shows how the winding shaft 26 is driven by a sprocket belt 27 by way of a toothed disc 30 which is coupled to the driving wheel 13 via gear wheels 28 and 29. FIG. 2 also shows how a taut section 31 and slack section 32 are each deflected along an angular path by means of a respective compensating roller 35 or 36 mounted on a swivel arm 33 or 34 and attached to a spring 37 or 38, the starting position of the said angular path being fixed by a stop 39.

The supply rolls of perforated film strip 7 and covering strip 8 are pushed on to the appropriate take-off roller 1 or 2, and the indicator 5 or 6 for indicating emptying of the roll is placed into position. The film strip and covering strip are either inserted afresh over the respective deflecting rollers 9 and loop stretcher 10 or 11 as far as the driving wheel 12 or 13 or they are glued to the end of the previous film strip 7 or covering strip 8 in front of the loop stretcher 10 or 11. When the loop stretchers 10 and 11 run empty, the corresponding brakes 3, 4 of the take-off rollers 1, 2 are automatically released by them for taking a refill.

The adhesive tape dispenser 23 transfers a strip of self adhesive tape from its roll through the stamper 24 to connect the end of the strip of film to the covering strip. A strip of adhesive from the dispenser 22 is applied to the covering strip over an aperture in this strip to secure the roll against opening.

The toothed driving wheel 12 drives the film strip 7; and the driving wheel 13 which has only 7 teeth drives the covering strip 8. In addition, the strip of film 7 and covering strip 8 are held to their respective driving wheels 12 and 13 by a vacuum. The circumference of the driving wheel 12 for the film strip 7 corresponds to the greatest length of film liable to occur while the circumference of the driving wheel 13 for the covering strip 8 corresponds to the smallest length of covering strip. The covering strips 8, which may vary in their total length by up to 8 mm, are correctly positioned on the driving wheel 13 in relation to the teeth 15 by being pulled forwards once in each operating cycle by air injection between the driving wheel 13 and strip 8 to act as air cushion. The film strip 7, which varies in total length by up to 0.5 mm, is pulled back over the teeth 14 once in each operating cycle.

The driving wheel 13, which is rotated at a constant angular velocity by an electric motor whose torque and speed of revolution are adjustable, is connected to the driving wheel 12 by a star wheel drive. This is so arranged that the film strip 7 and covering strip 8 can be driven at the same velocity and one length of covering strip and one length of film are displaced in each operating cycle. The driving wheel 12 is fitted into the arrangement in such a manner that corresponding perforations in the film and in the covering strip coincide.

The air channel 16 on the outside of the film driving wheel 12 and the air channel 17 on the outside of the covering strip driving wheel 13 are provided to hold the strips by vacuum.

The covering strip 8, which may vary up to 8 mm in its total length, is positioned on the driving wheel 13 over teeth 15. Once in each operating cycle the vacuum is shut off and for a short time there is blown air in the air channel 17. This air between the driving wheel 13 and the cover strip 8 acts as an air cushion. The perforations engaged over teeth 15 and are so positioned exactly.

The film strip 7, which varies by up to 0.5 mm in total length, is engaged in the same manner on the teeth 14 to position the film exactly.

Figure 4:
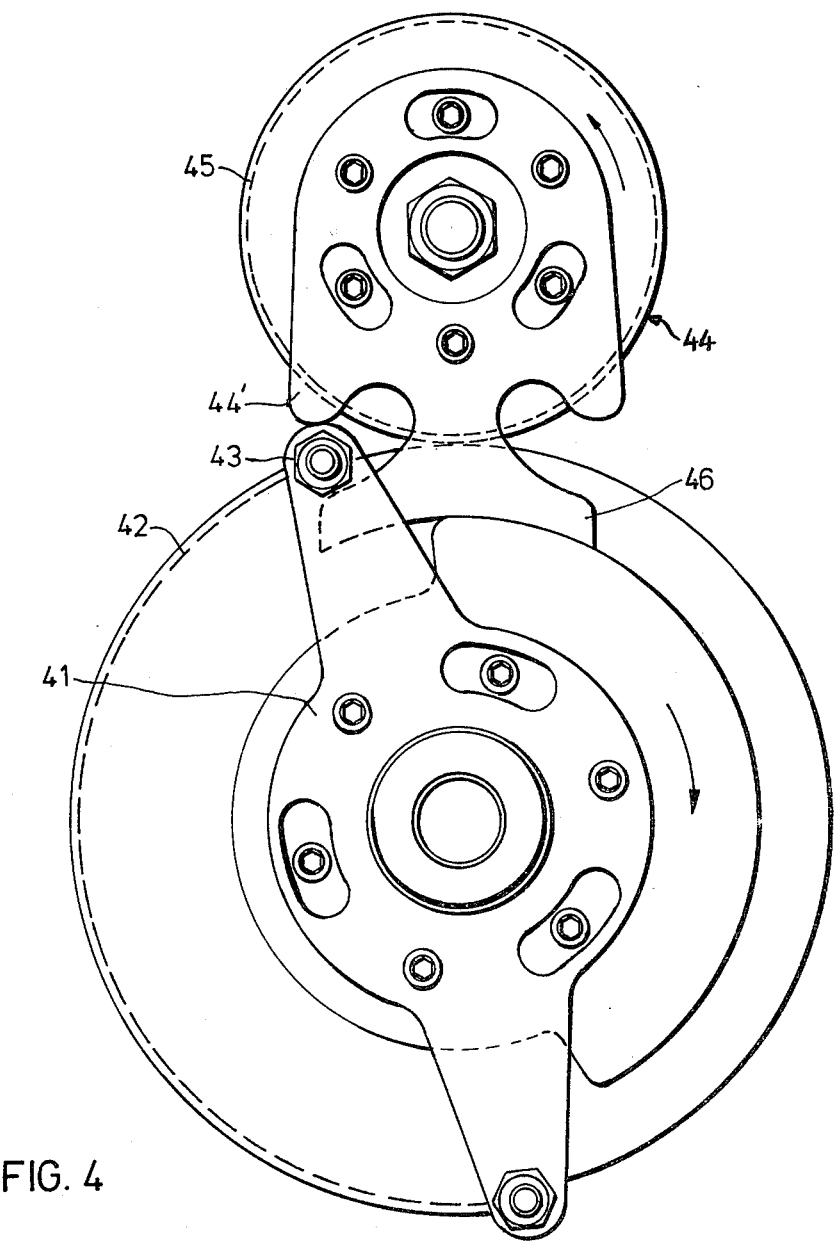
FIG. 4 is a side elevational view of a star wheel drive between film and covering strip drive wheel.

FIG. 4 shows star wheel drive. The star wheel 41 has two arms 43 and a toothed rim 42 on the portion of its circumference which extends only from one arm 43 to the other. The driven wheel 44 has a formed disc 44' in the shape of a "Maltese cross", but only with two cutouts. On its outside the driven wheel 44 has a toothed rim 45 around the circumference. The star wheel 41 is driven continuously and mounted on the same axis as the wheel for the covering strip 8.

If the arm 43 comes into the cutout of the disc 44', the wheel 44 is accelerated. The toothed rim 42 of the star wheel drives the wheel 44 for one turn. The other arm 43 goes into the other cutout of disc 44' and stops the driven wheel 44. The curved pieces 46 avoid a movement of the driven wheel 44 on whose axis the film driving wheel is mounted. So it is possible to transport the short film 7 and the longer covering strip 8 in substantially exact correspondence to the winding station 26.

The cutting devices provided for severing the film strip 7 and covering strip 8 comprise a rotary cutting knife driven by the driving wheel 12 or 13 respectively and a cutting plate 18 or 19 respectively, embedded in the circumference of the driving wheel 12 or 13 respectively. The cutting plate 19 projects slightly so that the knife will cut only once in each revolution of the driving wheel.

The stamper 24 is mounted on a wheel which is driven, for example, by a pulley and toothed belt transmission (not shown) connecting the wheel to the driving wheel 13.

The strip of film 7 and covering strip 8 reach the winding shaft 26 through a film guide and a covering strip guide respectively.

By means of a known coupling arrangement, the reel 40 is driven at a speed of rotation which is controlled by the increase in the diameter of the roll while the film strip 7 and covering strip 8 are fed in at the same velocity.

What we claim is:

1. An apparatus for winding a reel of perforated film strip and at the same time inserting a perforated covering strip in between the film strip windings, comprising a winding apparatus and, connected thereto, separate feed devices, one for supplying the film strip to the winding apparatus and the other for supplying the covering strip, each of said feed devices comprises sequentially traversed by the film and covering strips a supply roll, a loop stretcher for equalizing the lengths of strip, a driving wheel and rotating cutting knife associated therewith and deflecting rollers, an adhesive tape dispenser with a rotating stamper applicator being arranged in the feed device for the film strip and an adhesive tape dispenser with an auxiliary roller in the feed device for covering strip, the driving wheels for the film strip and the covering strip are positively connected by a drive and are coupled to the winding shaft by way of a sprocket belt, the sprocket belt having a taut section, a compensating roller over which the taut section is deflected, the compensating roller being suspended by a tension spring and provided with a stop on one side whereby the taut section is divided into two segments which can be shortened as the circumferential winding force increases, the sprocket belt having a slack section, another compensating roller engaged with and deflecting the slack section, the other roller being suspended by an adjustable tension spring so that the taut section can take up the slack of said sprocket belt released from the taut section, vacuum openings for holding the film and covering strip on the driving wheels, air nozzles for correct positioning of the film strip and covering strip are provided on the circumference of the driving wheels, and means for opening the air nozzles for a short moment to slide the edges of the perforations in the film strip and in the covering strip against the teeth on the driving wheels whereby the perforations are engaged with the teeth.

2. An apparatus according to claim 1, wherein the compensating rollers are mounted on pivotal arms.

* * * * *